United States Patent Office 3,581,342
Patented June 1, 1971

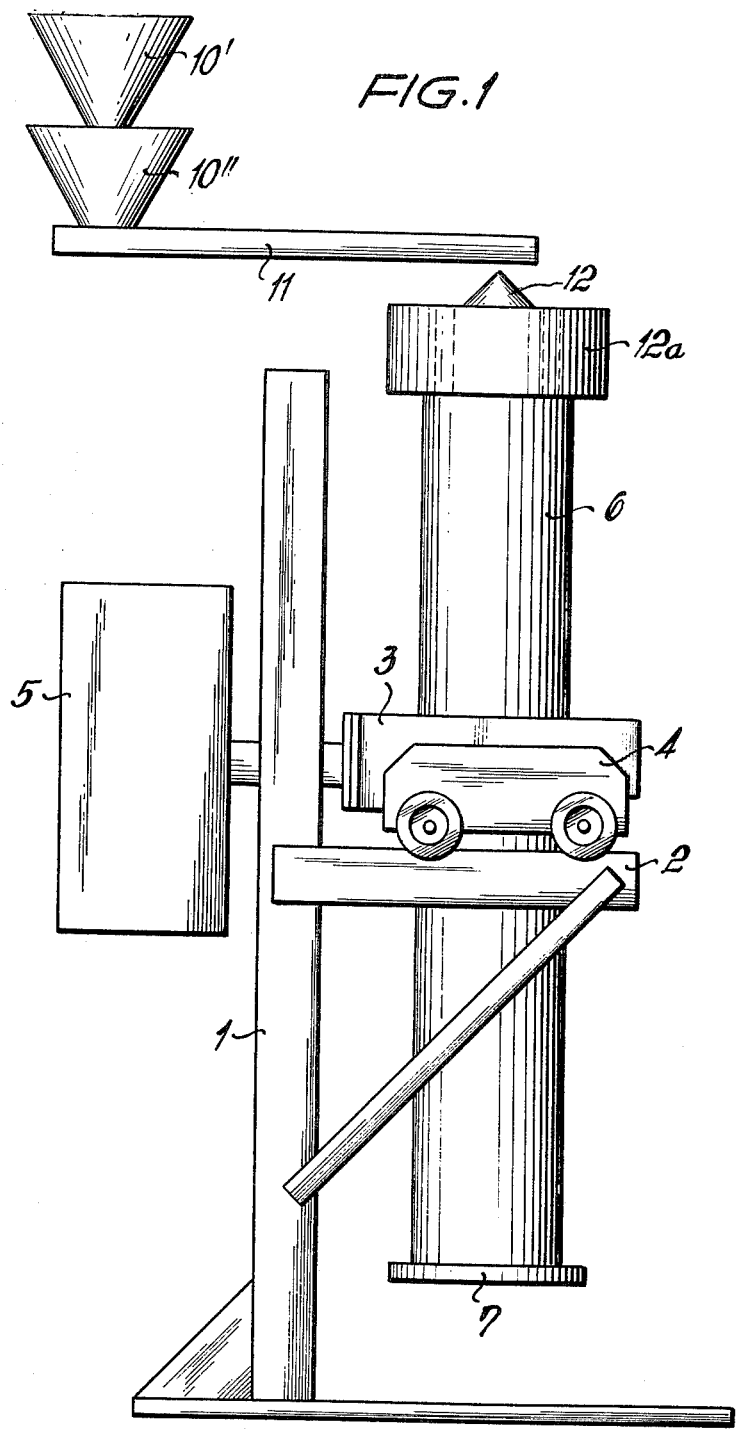

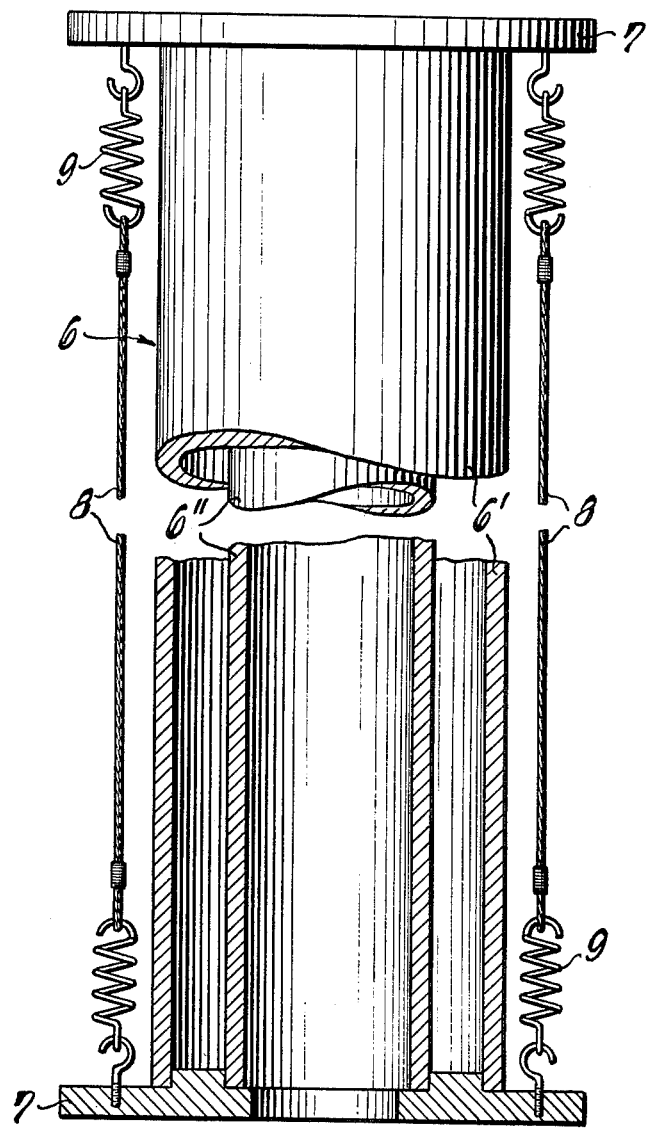

3,581,342
APPARATUS FOR MANUFACTURE OF POROUS THIN-WALLED TUBING
Otto Ewald Dietzel, Gelsenkirchen-Buer, and Rudolf Hesse, Oberhausen-Sterkrade, Germany, assignors to Ruhrchemie Aktiengesellschaft and Mannesmann Aktiengesellschaft
Filed Apr. 18, 1968, Ser. No. 722,333
Claims priority, application Germany, Apr. 22, 1967,
R 45,831
Int. Cl. B29c 1/00
U.S. Cl. 18—5                                          2 Claims

ABSTRACT OF THE DISCLOSURE

A method for the production of thin-walled tubes from particulate sinterable plastic, comprising the introduction of a suitable plastic at a uniform rate of flow into a mold having a thin annular form. The mold is vibrated in a direction perpendicular to its axis at a constant rate during the filling. When filled, the mold is heated above the sintering temperature of the plastic thus forming thin-walled tubing of uniform gas permeability. A mold for carrying out this process is also disclosed.

---

The present invention is concerned with the manufacture of thin-walled gas permeable plastic tubing, more particularly an apparatus for carrying out such manufacture.

It is well known in the art to manufacture porous shapes of plastics by sintering of plastic powders. Tubes, plates, and molded articles of many forms have been commonly manufactured in this manner for many years.

The prior art recognized the problem of avoiding the formation of voids on filling a mold with granulated or particulate powder. This problem is especially serious in the manufacture of thin-walled tubes since a small void can have a great effect in such a situation. Such tubing was molded in devices wherein repeated vibration of the mold was achieved by tapping, shaking, or pushing. However, these expedients were insufficient to satisfactorily overcome the problem.

The plastic powder was normally poured into the annular space between two concentric steel tubes and it has been found that shaking or the like still leaves voids in the molded volume due to lack of uniform compacting over the length of the tube. The products of such prior-art methods do not have the uniform porosity or permeability which is a requirement of many applications, particularly for use as gas filters. It is therefore desirable to provide a method for the manufacture of such tubes from plastic powder which will overcome the foregoing disadvantages.

It is therefore among the objects of this invention to provide a method for producing thin-walled porous plastic tubing from particulate powder which is of uniform gas permeability throughout its length.

It is further among the objects of this invention to provide an apparatus for carrying out the foregoing process.

It is still further among the objects of this invention to provide a simple and economical means for molding thin-walled porous plastic tubing which is substantially foolproof in its operation.

In order to carry out the aforementioned objects the present invention has been devised. In accordance therewith, a particulate sinterable plastic powder is introduced at a uniform rate of flow into a cylindrical mold having a thin annulus while at the same time vibrating the mold in a direction perpendicular to its axis at a constant rate. After the mold is filled, it is then heated above the sintering temperature of the plastic, thus permitting the formation of porous tubing of uniform gas permeability. In the preferred form of the invention, the plastic powder used is polyethylene and the mold is heated to a temperature of approximately 150° C.

The device in which the process is carried out consists of two coaxially arranged cylindrical tubes generally placed in the vertical position. The tubes are held in their relative positions by any known means but it has been found especially convenient to use two fittings, one at either end of the tubes. Each fitting has an annular spacer which fits in the space between the inner and outer coaxial tubes. This provides a positive locating means for both tubes and prevents any undesired movement thereof. Means are provided for urging the two end fittings toward one another to avoid any possibility of their coming loose. A preferred form of such tensioning means comprises a plurality of cables extending substantially from one fitting to the other and having coil springs connected therebetween at one or more points.

The entire device is clamped into a support which is capable of vibration in a direction perpendicular to the axis of the tubes. Vibrating means of any known type is associated with the unit to actually impart the vibratory motion.

In a particularly preferred embodiment the mold is provided with two superimposed filling hoppers the upper projecting into the lower. The lower hopper discharges on a virbrating gutter which leads to the mold. Directly above the mold the gutter is provided with a circular outlet opening. The upper end of the mold has a filling cone placed thereon. The base diameter of the cone is approximately equal to the outside diameter of the inner tube. There is also provided an upstanding ring at the periphery of the outer tube to prevent spillage.

It has been found that if the mold as herein described is shaken with constant frequency perpendicular to its axis, a uniform degree of compaction over the entire length of the mold is obtained. After sintering of such tubing no variations in gas permeability of the completed item can be observed.

In the accompanying drawings constituting a part herein and in which like reference characters indicate like parts:

FIG. 1 is a side elevation of the entire device; and

FIG. 2 is a view partially in section of the mold portion alone.

Referring more particularly to FIG. 1, support 1 carries bracket 2 to which is connected clamping device 3. In the preferred form of the invention, clamping device 3 comprises a ring which grips mold 6 at a point approximately midway between its ends. Clamping device 3 has affixed thereto carriage 4 which in turn carries wheels which roll on bracket 2. Clearly, clamping device 3 may simply rest in a "saddle" formed by carriage 4 rather than be affixed thereto. Vibrating means 5 is provided to bear against clamping device 3 causing it to oscillate in the horizontal direction as shown in FIG. 1. Movement is permitted by virtue of the rolling of the wheels on carriage 4.

Sintering mold 6 is composed of outer tube 6' and inner tube 6" coaxially mounted between ring covers 7. These covers have an annular spacing portion which serves to locate tubes 6' and 6" relative to one another. The lower cover 7 forms a closure for the annulus between the tubes 6' and 6", whilst permitting free access into the interior of the inner tube 6". The cover 7 at the opposite upper end of the mold also permits free access into the interior of the inner tube 6". In a preferred form of the invention covers 7 are joined by bracing wires 8 having springs 9 between their ends and the ring covers 7.

The preferred feeding mechanism consists of filling cone 12 on the upper end of mold 6. Cone 12 is beneath an opening (not shown) in vibrating gutter 11. Gutter 11 carries the feed from hopper 10" to the opening above cone 12. An upper filling hopper 10' feeds into lower filling hopper 10".

In operation, a particulate sinterable plastic powder is fed into hopper 10'. This in turn feeds into hopper 10" and thence onto vibrating gutter 11. The granules are carried along gutter 11 to the end remote from hopper 10". They fall through the hole at that end and strike cone 12. Since the base diameter of cone 12 is substantially equal to the diameter of the inner tube 6", the particles are carried into the annular space between tubes 6' and 6". While this is going on, vibrator 5 is oscillating carriage 4 in a horizontal direction. This moves clamping device 3 in the same manner which in turn carries mold 6. Thus, in a simple manner, a uniform rate of vibration is applied directly perpendicular to the axis of mold 6.

When the mold is full, cone 12 is removed, the mold is closed by upper cover 7 and the filled mold is placed in an oven provided with a circulating heating gas, which may then flow in contact with the exterior of the tube 6' and the interior of the tube 6" for sintering the charge.

An upstanding ring 12a is provided at the periphery of the outer tube 6' to prevent spillage.

In a specific demonstration of this method and device polyethylene powder was poured into a sintering mold such as has been described herein. The tubes were of steel each 1.1 meters long and the mold was designed to produce a finished tube having an outer diameter of 100 millimeters and a wall thickness of 10 millimeters. The vibrator was turned on as the powder was being poured in. It took 8 minutes to completely fill the mold which was then placed in a heating oven and brought to a temperature of approximately 150° C. which is above the sintering temperature of polyethylene. When sintering was complete, the mold was permitted to cool down and the finished tube was removed. An examination of the tube revealed that both the inner and outer surfaces thereof were completely smooth and a test of the gas permeability of various sections thereof revealed no variation.

While only a limited number of embodiments of the foregoing invention have been expressly described, nonetheless it is apparent that various changes such as are known to those having reasonable skill in the art may be made without departing from the spirit thereof. In view of this, the invention is to be broadly construed and not to be limited except by the character of the claims appened hereto.

What is claimed is:

1. A mold for thin-walled tubing comprising an outer vertical cylindrical tube and an inner cylindrical tube, said tubes being coaxially arranged and forming an annular space therebetween, a fitting on each end of said tubes maintaining said tubes in coaxial, spaced relationship, and means for vibrating said mold at a constant rate in a direction perpendicular to its axis, wherein said means for vibrating comprises a clamp securely gripping said mold, said clamp slidably mounted on a horizontal support, and a vibrating device adapted to cause said clamp to reciprocate on said support.

2. A device according to claim 1 wherein said clamp is mounted on wheels which are adapted to roll on said support.

References Cited
UNITED STATES PATENTS

| | | | |
|---|---|---|---|
| 1,025,663 | 5/1912 | Wert | 25—35 |
| 1,885,774 | 11/1932 | Showers | 25—103 |
| 2,091,385 | 8/1937 | Trickey | 25—41(J)X |
| 2,568,332 | 9/1951 | Genovese | 18—30FHUX |
| 2,614,312 | 10/1952 | Rankin et al. | 25—41(J)X |
| 3,000,070 | 9/1961 | Gagne | 25—41(J) |
| 3,150,214 | 9/1964 | Scalora et al. | 18—12FUX |
| 3,201,843 | 8/1965 | Osneker | 25—41(J)X |

J. SPENCER OVERHOLSER, Primary Examiner

M. O. SUTTON, Assistant Examiner

U.S. Cl. X.R.

25—41